(12) United States Patent
Shimura et al.

(10) Patent No.: US 9,453,543 B2
(45) Date of Patent: Sep. 27, 2016

(54) BRAKING DEVICE

(71) Applicants: Ryota Shimura, Tokyo (JP); Daisuke Yamada, Tokyo (JP)

(72) Inventors: Ryota Shimura, Tokyo (JP); Daisuke Yamada, Tokyo (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 0 days.

(21) Appl. No.: 14/400,622

(22) PCT Filed: Mar. 11, 2013

(86) PCT No.: PCT/JP2013/056569
§ 371 (c)(1),
(2) Date: Nov. 12, 2014

(87) PCT Pub. No.: WO2013/175830
PCT Pub. Date: Nov. 28, 2013

(65) Prior Publication Data
US 2015/0144442 A1 May 28, 2015

(30) Foreign Application Priority Data

May 22, 2012 (JP) .................................. 2012-116283

(51) Int. Cl.
*F16D 57/00* (2006.01)
*F16D 63/00* (2006.01)
*F16D 121/28* (2012.01)

(52) U.S. Cl.
CPC ........... *F16D 57/002* (2013.01); *F16D 63/002* (2013.01); *F16D 2121/28* (2013.01)

(58) Field of Classification Search
CPC ............... F16D 57/002; F16D 63/002; F16D 2121/28; F16F 9/535
USPC ...................... 188/267, 267.2, 161
See application file for complete search history.

(56) References Cited

U.S. PATENT DOCUMENTS 6,854,573 B2 * 2/2005 Jolly ..................... F16D 57/002
188/267
2002/0140145 A1 * 10/2002 Smith, Jr. ............... F16F 9/535
267/140.15

FOREIGN PATENT DOCUMENTS

JP           2011247403 A  * 12/2011

* cited by examiner

*Primary Examiner* — Melanie Torres Williams
(74) *Attorney, Agent, or Firm* — Cozen O'Connor

(57) ABSTRACT

A braking device capable of effectively causing a shearing stress of a magnetorheological fluid to act on both surfaces of the rotation body is provided. The present invention provides a braking device including a first soft magnetic material (1), a coil (3) attached to the first soft magnetic material (1), a second soft magnetic material (2), a activation chamber (4) formed between the first soft magnetic material (1) and the second soft magnetic material (2), and a rotation body (5) provided inside of the activation chamber (4), and a magnetorheological fluid (6) filling a gap between the rotation body (5) and the first soft magnetic material (1) and a gap between the rotation body (5) and the second soft magnetic material (2), wherein the rotation body (5) includes low magnetoresistive parts (5a, 5b) made of a soft magnetic material and a high magnetoresistive part (5c) in which a magnetic flux is less likely to flow, and the high magnetoresistive part (5c) is provided at a portion of the rotation body (5) facing the coil (3).

2 Claims, 5 Drawing Sheets

BRAKING DEVICE

PRIORITY CLAIM

This is a U.S. national stage of application PCT/JP2013/056569, filed on Mar. 11, 2013. Priority is claimed on Japanese Application No.: JP2012-116283, filed May 22, 2012, the content of which is incorporated here by reference.

TECHNICAL FIELD

The present invention relates to a braking device using a magnetorheological fluid.

BACKGROUND ART

In the past, a braking device is known, which comprises a non-movable body, a movable body capable of rotating inside of the non-movable body, a magnetorheological fluid filled between the movable body and the non-movable body, and a coil configured to generate a magnetic field applied to the magnetorheological fluid.

In this kind of braking device, a shearing stress of the magnetorheological fluid is increased when the magnetic field is applied to the magnetorheological fluid, and the braking device, by making use of the increase of the shearing stress of the magnetorheological fluid, decelerates the rotation speed of the movable body or stops the rotation of the movable body. The magnetic field applied to the magnetorheological fluid is generated by passing an electric current through the coil.

However, in this kind of braking device, the movable body is an object made of a soft magnetic material, and the magnetic resistance of the movable body is low, and accordingly, most of the magnetic flux flows through the movable body. Therefore, there is a problem in that the shearing stress of the magnetorheological fluid acts on the surface facing the coil of the movable body, but it is difficult for the shearing stress of the magnetorheological fluid to act on the surface at the opposite side of the movable body.

CITATION LIST

Patent Literature

Patent Literature 1: JP 4695835 B1

SUMMARY OF INVENTION

Technical Problem

A problem to be solved by the present invention is to provide a braking device capable of effectively causing the shearing stress of the magnetorheological fluid to act on both surfaces of the rotation body.

Solution to Problem

In order to solve the above problem, the present invention provides the following braking device.
1. A braking device comprising:
   a first soft magnetic material;
   a coil attached to the first soft magnetic material;
   a second soft magnetic material;
   an activation chamber formed between the first soft magnetic material and the second soft magnetic material;
   a rotation body provided inside of the activation chamber; and
   a magnetorheological fluid filling a gap between the rotation body and the first soft magnetic material and a gap between the rotation body and the second soft magnetic material,
   wherein the rotation body comprises a low magnetoresistive part made of a soft magnetic material and a high magnetoresistive part in which a magnetic flux is less likely to flow, and
   wherein the high magnetoresistive part is provided at a portion of the rotation body facing the coil.
2. The braking device according to claim 1, wherein the high magnetoresistive part is an object made of a non-magnetic material.
3. The braking device according to claim 1, wherein the high magnetoresistive part is a hollow portion.

Advantageous Effects of Invention

In the braking device according to the present invention, the rotation body comprises the low magnetoresistive part made of the soft magnetic material and the high magnetoresistive part in which the magnetic flux is less likely to flow, and the high magnetoresistive part is provided at a portion of the rotation body facing the coil. Therefore, the magnetic flux flows from the first soft magnetic material via the rotation body to the second soft magnetic material while the magnetic flux hardly decreases, and the magnetic flux flows from the second soft magnetic material via the rotation body to the first soft magnetic material while the magnetic flux hardly decreases. Therefore, according to the braking device of the present invention, the shearing stress of the magnetorheological fluid can be caused to effectively act on both surfaces of the rotation body.

DESCRIPTION OF EMBODIMENTS

Figure 1:
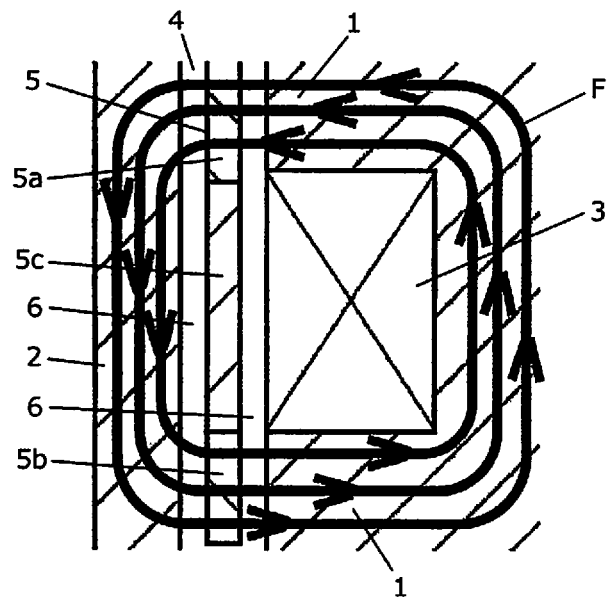
FIG. 1 is a figure schematically illustrating an action of a braking device according to the present invention.

A braking device according to the present invention comprises a first soft magnetic material 1, a coil 3 attached to the first soft magnetic material 1, a second soft magnetic material 2, an activation chamber 4 formed between the first soft magnetic material 1 and the second soft magnetic material 2, a rotation body 5 provided inside of the activation chamber 4, and a magnetorheological fluid 6 filling a gap between the rotation body 5 and the first soft magnetic material 1 and a gap between the rotation body 5 and the second soft magnetic material 2. (See FIG. 1)

Like the braking device according to the present invention, a braking device according to the comparative example comprises a first soft magnetic material 1', a coil 3' attached to the first soft magnetic material 1', a second soft magnetic material 2', an activation chamber 4' formed between the first soft magnetic material 1' and the second soft magnetic material 2', a rotation body 5' provided inside of the activation chamber 4', and a magnetorheological fluid 6' filling a gap between the rotation body 5' and the first soft magnetic material 1' and a gap between the rotation body 5' and the second soft magnetic material 2'. (See FIG. 2)

Both of the devices are the same in that the first soft magnetic materials 1, 1' and the second soft magnetic materials 2, 2' are non-movable bodies, and the rotation bodies 5, 5' are movable bodies that can freely rotate inside of the activation chambers 4, 4'. However, as shown in FIG. 1, the rotation body 5 of the present invention comprises low magnetoresistive parts 5a, 5b made of soft magnetic materials and a high magnetoresistive part 5c in which the magnetic flux F is less likely to flow, and the rotation body 5 of the present invention is different in that the high magnetoresistive part 5c is provided at a portion facing the coil 3 of the rotation body 5, as compared with the rotation body 5' according to the comparative example is an object the entirety of which is made of a soft magnetic material and which exhibits a low magnetic resistance as shown in FIG. 2.

Figure 2:
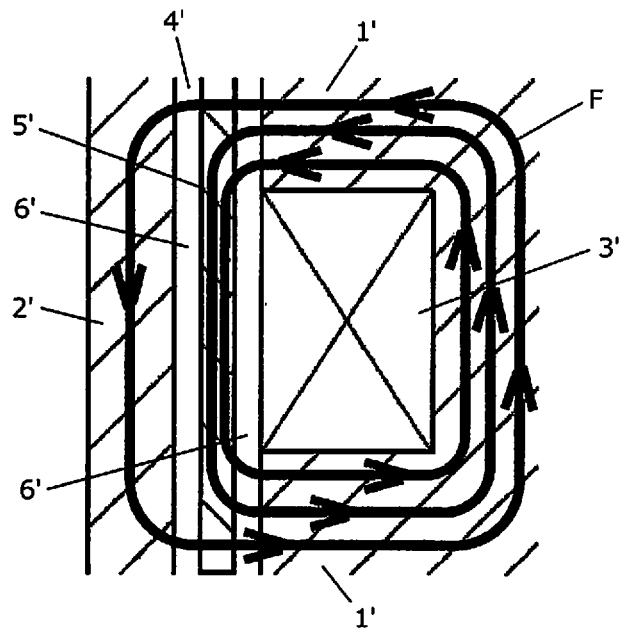
FIG. 2 is a figure schematically illustrating an action of a braking device according to a comparative example.

As shown in FIG. 2, in the braking device according to the comparative example, when the magnetic flux F flows from the first soft magnetic material 1' to the rotation body 5', most of the magnetic flux F flows through the rotation body 5'. Therefore, there is only little magnetic flux F flowing from the first soft magnetic material 1' via the rotation body 5' to the second soft magnetic material 2'. According to this configuration, most of the magnetic flux F flows from the rotation body 5' to the first soft magnetic material 1', and therefore, the shearing stress of the magnetorheological fluid 6' filled in the gap between the first soft magnetic material 1' and the rotation body 5' acts on one of the surfaces of rotation body 5' (a surface facing the first soft magnetic material 1'). However, since there is little magnetic flux F flowing from the second soft magnetic material 2' via the rotation body 5' to the first soft magnetic material 1', the shearing stress of the magnetorheological fluid 6' filling the gap between the second soft magnetic material 2' and the rotation body 5' hardly acts on the other of the surfaces of the rotation body 5' (a surface facing the second soft magnetic material 2'). Therefore, it is difficult to generate a large braking force.

In contrast, in the braking device according to the present invention, as shown in FIG. 1, even though the magnetic flux F flows from the first soft magnetic material 1 to the rotation body 5, the flow of the magnetic flux F is restricted by the high magnetoresistive part 5c, and therefore, the magnetic flux F passes the rotation body 5 to the second soft magnetic material 2 while the magnetic flux F hardly decreases in the flow. The magnetic flux F flows from the second soft magnetic material 2 via the rotation body 5 to the first soft magnetic material 1 while the magnetic flux F hardly decreases. According to this configuration, the shearing stress of the magnetorheological fluid 6 effectively acts on both surfaces of the rotation body 5, and therefore, a large braking force can be generated.

Hereinafter, an embodiment of the present invention will be explained with reference to drawings, but the technical scope of the present invention is not limited to the contents of the following explanation.

First Embodiment

Figure 3:
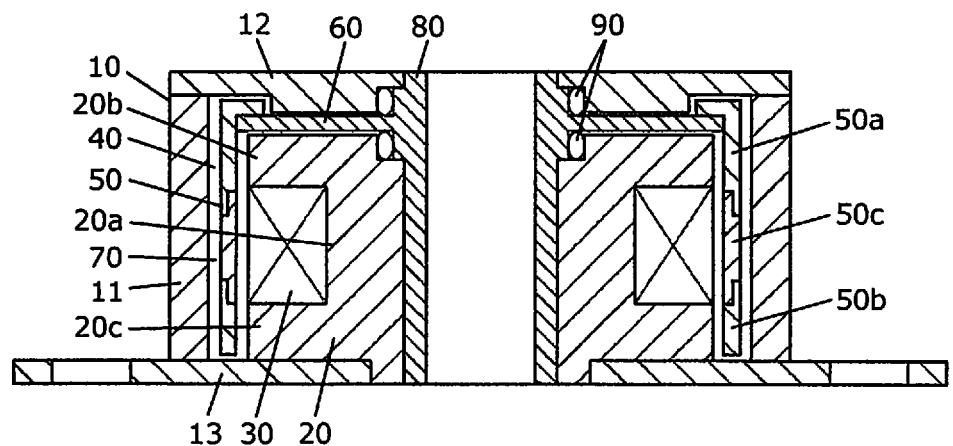
FIG. 3 is a cross sectional view illustrating an internal structure of a braking device according to a first embodiment of the present invention.

FIG. 3 is a cross sectional view illustrating an internal structure of a braking device according to a first embodiment of the present invention. As shown in FIG. 1, the braking device according to the present embodiment comprises a housing 10, a coil holding unit 20, a coil 30, an activation chamber 40, a rotor 50, a plate 60, and a magnetorheological fluid 70.

The housing 10 comprises a peripheral wall 11, an end wall 12, and a bottom wall 13. The peripheral wall 11 is made of a soft magnetic material, and the shape thereof is a cylindrical shape. The peripheral wall 11 corresponds to "the second soft magnetic material" of the present invention. The end wall 12 is made of a non-magnetic material, and is adhered to one of the end portions of the peripheral wall 11 with an adhesive agent. The bottom wall 13 is made of a non-magnetic material, and is adhered to the other of the end portions of the peripheral wall 11 with an adhesive agent. Examples of adhesive agents include an epoxy-based adhesive agent. When the adhesive agent is used, there is an advantage in that the magnetorheological fluid 70 can be prevented from leaking from the joint portion. It should be noted that it may be possible to constitute the end wall 12 by a soft magnetic material and integrally form the peripheral wall 11 and the end wall 12. Alternatively, the bottom wall 13 may be constituted by a soft magnetic material, and the peripheral wall 11 and the bottom wall 13 can be formed integrally.

A hole is formed in the center of the end wall 12 so that one of the end portions of a bearing 80 is inserted into the hole. The bearing 80 is of a non-magnetic material, and has a hole for connection with a shaft. In the present embodiment, the shaft is a constituent element of an object controlled by the braking device, and is not a constituent element of the braking device. Alternatively, a shaft may be employed instead of the bearing 80, and this shaft may be connected with the object controlled by the braking device.

A hole is formed in the center of the bottom wall 13 so that a portion of the coil holding unit 20 is inserted into the hole. The coil holding unit 20 is of a soft magnetic material, and is fixed to the bottom wall 13 using an adhesive agent. The coil holding unit 20 corresponds to "the first soft magnetic material" of the present invention. Examples of adhesive agent include an epoxy-based adhesive agent. When the adhesive agent is used, there is an advantage in that the magnetorheological fluid 70 can be prevented from leaking from the joint portion. A hole is formed in the center of the coil holding unit 20 so that the bearing 80 is inserted into the hole.

The coil holding unit 20 comprises a cylindrical portion 20a, and flanges 20b, 20c extending to the outer side with the cylindrical portion 20a interposed therebetween. The coil 30 is arranged in a space surrounded by the cylindrical portion 20a and the flanges 20b, 20c, and is attached to the coil holding unit 20. The coil 30 is connected to lead wires (not shown) for passing an electric current to the coil 30.

The activation chamber 40 is formed between an inner peripheral surface of the peripheral wall 11 and an outer peripheral surface of the coil holding unit 20 in parallel with the inner peripheral surface (outer peripheral surfaces of the flanges 20b, 20c). The inner peripheral surface of the peripheral wall 11 is at the position farthest from the center of rotation of the rotor 50 in the radial direction inside of the housing 10. More specifically, the activation chamber 40 exists at the outermost position in the housing 10.

The rotor 50 is provided inside of the activation chamber 40. The rotor 50 is a cylindrical shape having an outer peripheral surface having a gap between the outer peripheral surface of the rotor 50 and the inner peripheral surface of the peripheral wall 11 of the housing 10, and an inner peripheral surface having a gap between the inner peripheral surface of the rotor 50 and the outer peripheral surface of the coil holding unit 20. The rotor 50 corresponds to "the rotation body" of the present invention.

Figure 4:
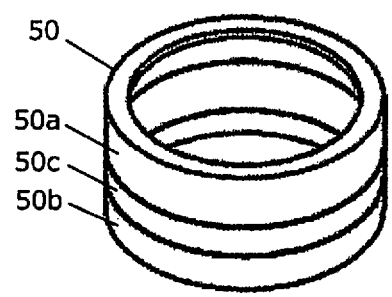
FIG. 4 is a perspective view illustrating a rotor (rotation body) employed in the first embodiment.

As shown in FIG. 4, the rotor 50 employed in the present embodiment has a three-layer structure in which a cylinder portion made of a non-magnetic material (third cylinder portion 50c) is sandwiched between two cylinder portions (a first cylinder portion 50a and a second cylinder portion 50b) both of which are made of a soft magnetic material. The third cylinder portion 50c is adhered to the first cylinder portion 50a and the second cylinder portion 50b with an adhesive agent. An example of adhesive agent includes an epoxy-based adhesive agent.

The first cylinder portion 50a and the second cylinder portion 50b correspond to a "low magnetoresistive part" according to the present invention. The third cylinder portion 50c corresponds to a "high magnetoresistive part" according to the present invention, and corresponds to "an object made of a non-magnetic material" according to the present invention. As shown in FIG. 3, the third cylinder portion 50c is provided at a portion facing the coil 30 of the rotor 50.

The rotor 50 is connected to the bearing 80 via the plate 60. According to this configuration, the shaft of the object controlled by the braking device rotates, and when the bearing 80 accordingly rotates, the rotor 50 and the plate 60 rotate together. The plate 60 is made of a non-magnetic material, and is provided in a gap formed between the end wall 12 and the coil holding unit 20. This gap is in communication with the activation chamber 40.

The rotor 50 is fixed to the plate 60 using an adhesive agent. Examples of adhesive agent include an epoxy-based adhesive agent. It should be noted that the plate 60 may be constituted by the soft magnetic material, and the rotor 50 and the plate 60 may be integrally formed.

The magnetorheological fluid 70 is a suspension made by dispersing ferromagnetic particles in a fluid such as synthetic oil, and is in a liquid form in the state of non-magnetic field, and when a magnetic field is applied, dispersed particles connect with each other, so that cross-link structures are formed, and the magnetorheological fluid 70 has such property that the shearing stress increases in accordance with the magnetic field strength. The magnetorheological fluid 70 fills the inside of the activation chamber 40. More specifically, the magnetorheological fluid 70 fills the gap between the rotor 50 and the peripheral wall 11, and the gap between the rotor 50 and the coil holding unit 20. In the present embodiment, an O ring 90 is provided to prevent the magnetorheological fluid 70 from leaking through the gap formed between the end wall 12 and the coil holding unit 20.

The rotor 50 employed in the present embodiment is constituted by a soft magnetic material and a non-magnetic material, and the plate 60 is constituted by a non-magnetic material, and therefore, after the coil 30 is no longer energized, no magnetization remains in the rotor 50 and the plate 60. Therefore, the rotor 50 and the plate 60 can be freely rotated.

In the braking device configured as described above, when an electric current is provided to the coil 30 via lead wires while the rotor 50 is rotating, this generates a magnetic field, and this magnetic field is applied to the magnetorheological fluid 70. Accordingly, shearing stress occurs in the magnetorheological fluid 70, so that the rotation speed of the rotor 50 can be decelerated, or the rotation of the rotor 50.

In the braking device according to the present embodiment, the rotor 50 comprises a low magnetoresistive part (the first cylinder portion 50a and the second cylinder portion 50b), and a high magnetoresistive part (the third cylinder portion 50c) in which the magnetic flux is less likely to flow, and the high magnetoresistive part (third cylinder portion 50c) is provided in the portion facing the coil 30 of the rotor 50. Therefore, the magnetic flux flows from the coil holding unit 20 via the rotor 50 to the peripheral wall 11 while the magnetic flux hardly decreases, and the magnetic flux flows from the peripheral wall 11 via the rotor 50 to the coil holding unit 20 while the magnetic flux hardly decreases. Therefore, according to the braking device of the present embodiment, the shearing stress of the magnetorheological fluid 70 can be caused to effectively act on the outer peripheral surface and the inner peripheral surface of the rotor 50, and as a result, a large braking force can be generated.

Further, in the braking device according to the present embodiment, the activation chamber 40 is located at the outermost position in the housing 10. On the other hand, the rotor 50 is provided inside of the activation chamber 40, and is in the cylindrical shape including the outer peripheral surface having the gap between the outer peripheral surface and the inner peripheral surface of the peripheral wall 11 and the inner peripheral surface having the gap between the inner peripheral surface and the outer peripheral surface of the coil holding unit 20. The magnetorheological fluid 70 fills the inside of the activation chamber 40, and therefore, the surfaces facing each other with the magnetorheological fluid 70 interposed therebetween includes not only the inner peripheral surface of the peripheral wall 11 and the outer peripheral surface of the rotor 50 but also the outer peripheral surface of the coil holding unit 20 and the inner peripheral surface of the rotor 50. Therefore, the size of the surfaces facing each other with the magnetorheological fluid 70 interposed therebetween can be increased. According to this configuration, at the position farthest from the center of rotation of the rotor 50, the shearing stress of the magnetorheological fluid 70 can be caused to act on the outer peripheral surface and the inner peripheral surface of the rotor 50 of which size of area in contact with the magnetorheological fluid 70 is large, and therefore, a large braking force can be generated.

Figure 5:
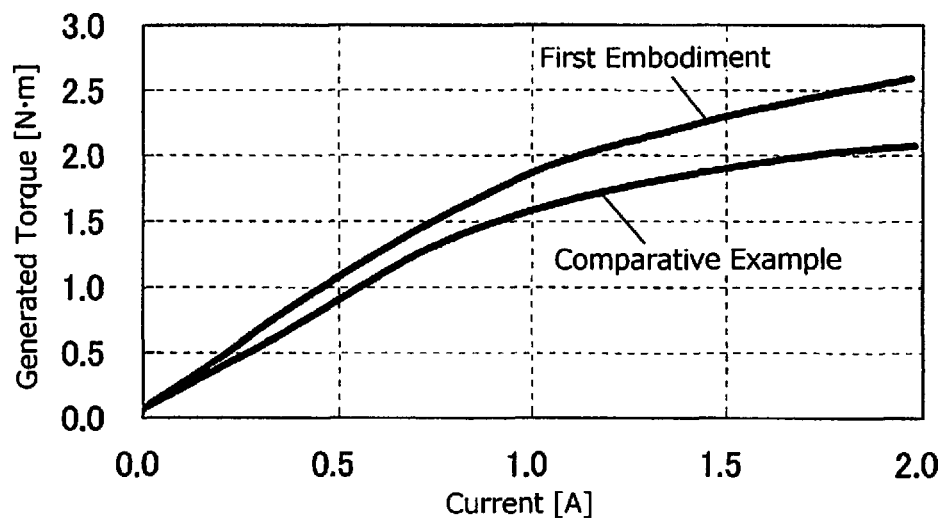
FIG. 5 is a graph illustrating braking characteristics according to the first embodiment and comparative example.
Figure 6:
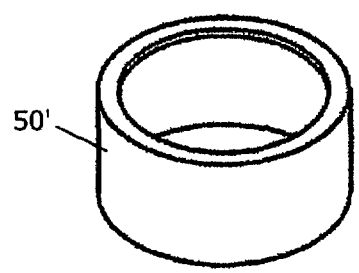
FIG. 6 is a perspective view illustrating a rotor according to a comparative example.

FIG. 5 is a graph illustrating braking characteristics of the braking device according to the first embodiment and the braking device according to the comparative example. As shown in FIG. 6, the braking device according to the comparative example is different from the braking device according to the first embodiment in that the entire rotor 50' is made of a soft magnetic material. As shown in this graph, as compared with the braking device according to the comparative example, the braking device according to the first embodiment can generate a larger torque in accordance with the increase in the value of the electric current provided to the coil 30.

Second Embodiment

Figure 7:
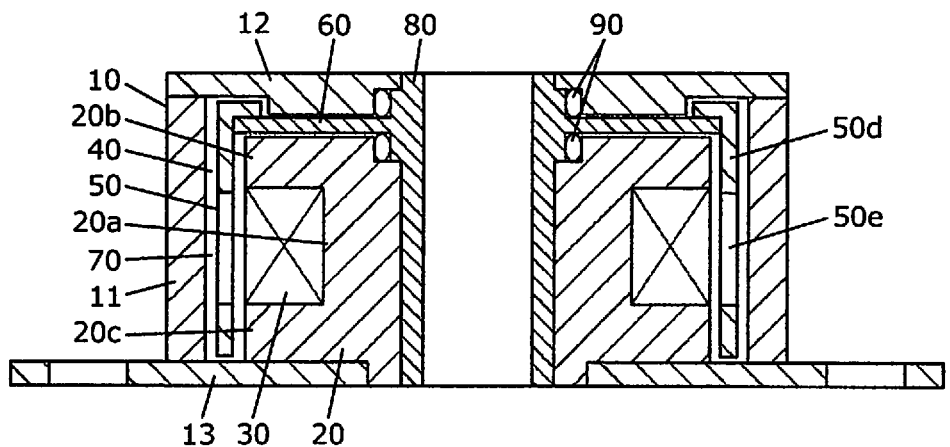
FIG. 7 is a cross sectional view illustrating an internal structure of a braking device according to a second embodiment of the present invention.
Figure 8:
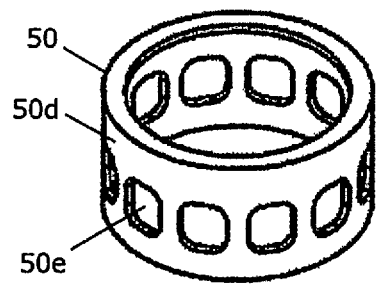
FIG. 8 is a perspective view illustrating a rotor (rotation body) employed in the second embodiment.

FIG. 7 is a cross sectional view illustrating an internal structure of a braking device according to the second embodiment of the present invention. FIG. 8 is a perspective view illustrating a rotor 50 employed in the present embodiment. As shown in these drawings, the structure of the rotor 50 of the braking device according to the preset embodiment is different from that of the braking device according to the first embodiment.

The rotor 50 employed in the present embodiment corresponds to a "rotation body" according to the present invention. This rotor 50 is made of a soft magnetic material, and has multiple hollow portions 50e at a portion facing the coil 30 of the rotor 50. A portion 50d of the rotor 50 which is made of a soft magnetic material corresponds to a "low magnetoresistive part" of the present invention. The hollow portion 50e corresponds to a "high magnetoresistive part" of the present invention.

Like the braking device according to the first embodiment, the braking device according to the present embodiment has the rotor 50 including a low magnetoresistive part (the portion 50d made of the soft magnetic material) and a high magnetoresistive part in which the magnetic flux is less likely to flow (hollow portion 50e). The high magnetoresistive part (hollow portion 50e) is provided at a portion facing the coil 30 of the rotor 50. Therefore, the magnetic flux flows from the coil holding unit 20 via the rotor 50 to the peripheral wall 11 while the magnetic flux hardly decreases, and the magnetic flux flows from the peripheral wall 11 via the rotor 50 to the coil holding unit 20 while the magnetic flux hardly decreases. Therefore, according to the braking device according to the present embodiment, the shearing stress of the magnetorheological fluid 70 can be caused to effectively act on the outer peripheral surface and the inner peripheral surface of the rotor 50, and therefore, as a result, a larger braking force can be generated.

Figure 9:
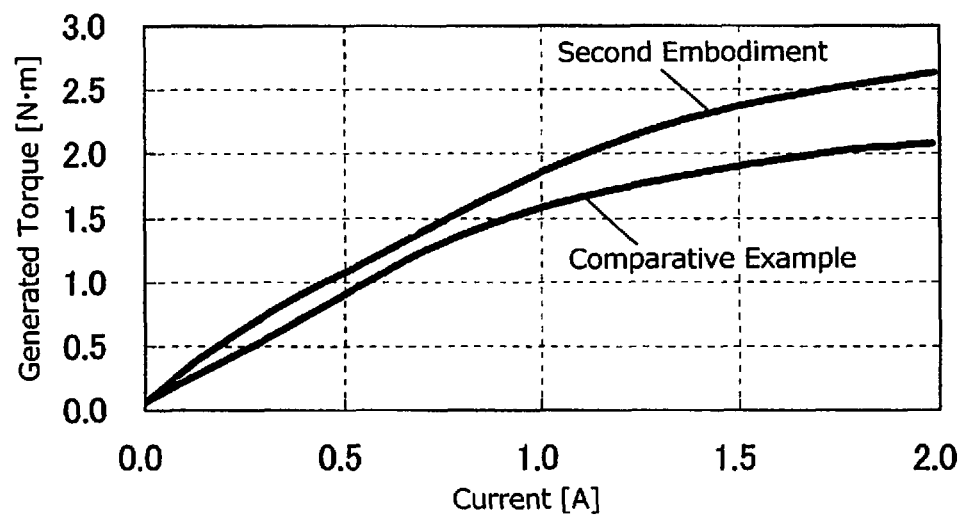
FIG. 9 is a graph illustrating braking characteristics according to the second embodiment and comparative example.

FIG. 9 is a graph illustrating braking characteristics of a braking device according to a second embodiment and the braking device according to the comparative example. As shown in FIG. 6, the braking device according to the comparative example is different from the braking device according to the second embodiment in that the entire rotor 50' is made of a soft magnetic material. As shown in this graph, as compared with the braking device according to the comparative example, the braking device according to the second embodiment can generate a larger torque in accordance with the increase in the value of the electric current provided to the coil 30.

REFERENCE SIGNS LIST

1, 1' first soft magnetic material
2, 2' second soft magnetic material
3, 3' coil
4, 4' activation chamber
5, 5' rotation body
5a, 5b low magnetoresistive part
5c high magnetoresistive part
6, 6' magnetorheological fluid
10 housing
11 peripheral wall
12 end wall
13 bottom wall
20 coil holding unit
20a cylindrical portion
20b, 20c flange
30 coil
40 first activation chamber
50, 50' rotor
50a first cylinder portion
50b second cylinder portion
50c third cylinder portion
50d portion made of soft magnetic material
50e hollow portion
60 plate
70 magnetorheological fluid
80 bearing
90 O ring

The invention claimed is:

1. A braking device comprising:
a first soft magnetic material;
a coil attached to the first soft magnetic material;
a second soft magnetic material;
an activation chamber formed between the first soft magnetic material and the second soft magnetic material;
a rotation body provided inside of the activation chamber; and
a magnetorheological fluid filling a gap between the rotation body and the first soft magnetic material and a gap between the rotation body and the second soft magnetic material,
wherein the rotation body is a cylindrical shape and comprises two low magnetoresistive parts and one high magnetoresistive part in which a magnetic flux is less likely to flow; the low magnetoresistive parts are made of a soft magnetic material, the high magnetoresistive part is made of a non-magnetic material, the rotation body has a three-layer structure in which the high magnetoresistive part is arranged between the low magnetoresistive parts; and the high magnetoresistive part is provided at a portion of the rotation body facing the coil.

2. A braking device comprising:
a first soft magnetic material;
a coil attached to the first soft magnetic material;
a second soft magnetic material;
an activation chamber formed between the first soft magnetic material and the second soft magnetic material;
a rotation body provided inside of the activation chamber; and
a magnetorheological fluid filling a gap between the rotation body and the first soft magnetic material and a gap between the rotation body and the second soft magnetic material,
wherein the rotation body is a cylindrical shape and comprises a low magnetoresistive part and a high magnetoresistive part in which a magnetic flux is less likely to flow; the low magnetoresistive part is made of a soft magnetic material; and the high magnetoresistive part comprises plural hollow portions provided at a portion of the rotation body facing the coil.

* * * * *